United States Patent [19]
Coleman et al.

[11] Patent Number: 4,645,242
[45] Date of Patent: Feb. 24, 1987

[54] HIGH PRESSURE MOUNTING WITH POSITIVE LOCK

[75] Inventors: Darrel F. Coleman; Horst W. Kalin, both of Longmont; Donald R. Verhaagen, Golden, all of Colo.

[73] Assignee: Dieterich Standard Corp., Boulder, Colo.

[21] Appl. No.: 769,431

[22] Filed: Aug. 26, 1985

[51] Int. Cl.⁴ .............................................. F16L 3/04
[52] U.S. Cl. ................................... 285/158; 285/354; 285/89; 285/82; 73/182; 73/861.67
[58] Field of Search ................. 73/182, 183, 861.65, 73/861.66, 861.67, 861.68; 285/89, 81, 82, 354, 158

[56] References Cited

U.S. PATENT DOCUMENTS

| | | | |
|---|---|---|---|
| 1,086,641 | 2/1914 | Blume | 285/354 X |
| 1,321,929 | 11/1919 | Loetzer | 285/386 X |
| 1,999,447 | 4/1935 | Dodge | 285/89 X |
| 4,142,577 | 3/1979 | Klein | 285/386 X |
| 4,445,713 | 5/1984 | Bruning | 285/158 X |

Primary Examiner—Richard J. Scanlan, Jr.
Assistant Examiner—Joseph A. Fischetti
Attorney, Agent, or Firm—Edwin L. Spangler, Jr.

[57] ABSTRACT

This invention relates to an improved high pressure mounting for removably positioning pitot tube type flow measurement devices in a pipeline where the mounting includes a hollow tubular collar welded to the pipe in alignment with a probe-receiving opening therein and which is sized to slidably receive the body of the probe for movement into and out of the pipe, a relatively deformable and compressible ferrule encircling the probe body movable into abutting relation to an annular seat provided on the end of the collar remote from the welded end thereof, and a compression nut adapted to be screwed onto a threaded end of the collar adjacent the seat and cooperate therewith and with the ferrule therebetween to crimp the latter tightly around the probe thus sealing the probe in a fixed operative position, the improved positive lock which is characterized by adding an externally-threaded male extension to the compression nut, providing the probe body with a fixed abutment-forming projection exposed beyond said extension, and mounting a hollow open-ended generally cup-shaped cap on the probe body on the opposite side of the projection from the extension, the projection being sized to pass easily into the cap while the latter has both an internally-threaded portion adapted to screw onto the extension as well as an abutment-forming shoulder positioned and adapted to engage the projection when thus threadedly interconnected thereby preventing the probe body from being withdrawn from the collar.

5 Claims, 3 Drawing Figures

HIGH PRESSURE MOUNTING WITH POSITIVE LOCK

Flow measurement devices of the pitot tube type in which the flow is calculated in terms of measured differential pressures are old and well known in the art. Such devices commonly consist of a hollow tubular probe having a so-called "bluff body" insertable into a pipe or conduit containing the flowing fluid, the flow of which is to be monitored. The bluff body is the portion which, in operative position, lies within the pipe, usually with its longitudinal axis normal to the flow, and containing both upstream and downstream-facing ports for sensing the impact pressure of the flowing fluid as well as a reference pressure from which a differential reading can be obtained. Since the readings are taken externally of the pipe, the probe must, of necessity, enter the pipe through an opening in its wall within which it is sealed. Some such installations provide for the temporary withdrawal of the probe from the pipe so that the latter may be cleaned or otherwise serviced while others are of a more or less permanent nature. Even the latter, however, provide for removal of the probe and the capping of the sleeve or coupling used to hold it in place.

One of the more common installation techniques employed by applicants is to weld a bell-flanged collar to the outside of the pipe with its axis normal and coincident with the centerline of the probe-receiving opening therein. The hollow interior cylindrical surface of this collar is sized to receive the cylindrical portion of the probe body with a sliding fit so that the latter may be moved into and out of the flow within the pipe as the occasion demands.

All such installations require that some sort of fluid-tight annular seal be provided between the probe body and the mounting therefor. In high pressure applications, this seal must not only be fluid tight but mechanically competent to withstand the internal pressure tending to expel the probe from the pipe. Applicants customarily handle this problem by providing the collar with an externally-threaded male extension on the end thereof remote from the welded bell-flange onto which extension screws a female compression nut. Opposed portions of the compression nut and collar extension are undercut and beveled so as to define cooperating opposed seats adapted upon being assembled and screwed together to engage and crimp a deformable ring type ferrule positioned therebetween tightly onto the body of the probe, all in a manner which is well known in connection with such compression fitting assemblies. When thus properly assembled, the probe is fixed in operative position with the beveled seat of the compression nut in continuous annular engagement with the ferrule fastened to the probe body tightly enough such that no internal pressure in the pipe is sufficient to blow it out. Unfortunately, occasional problems have arisen in connection with improper assembly.

It will be readily apparent that if one failed to screw the compression nut tightly enough onto the threaded extension of the collar to crimp the ferrule onto the probe body, the latter would be free to slip right through the compression fitting assembly and blow out leaving the probe-receiving opening uncovered thus allowing the contents of the pipe to escape. Moreover, an external examination of the assembly would not, necessarily, reveal anything wrong since all visible parts would be screwed together and welded to the pipe.

For the reason above-noted and further because of the danger associated with such a blow out, applicants have designed an improved essentially blow out proof mounting for flow measurement devices of this same general type which includes a permanent abutment on the body of the probe and a locknut-like cap having an opposed shoulder positioned and adapted to engage the latter and prevent withdrawal of the probe when the nut is screwed or otherwise detachably fastened to a threaded male extension of the compression nut. On the other hand, by merely unscrewing the compression nut from the bell-flanged collar, the probe can be freely backed out of the pipe even though the aforementioned nut remains screwed onto the cap.

It is, therefore, the principal object of the present invention to provide a novel and improved mounting for pitot tube type flow measurement instruments and the like.

A second objective of the invention is the provision of a mounting of the type aforementioned which is fully compatible with most existing mountings requiring only minor modifications therein.

Another object of the invention herein disclosed and claimed is to provide a lockable mounting for pitot tube type flow meters which can be simply and easily unlocked to permit complete removal thereof.

Still another objective is that of providing a compression ring assembly that includes means for locking same in assembled relation.

An additional object is to provide a fixed abutment and lock ring subassembly which when used in combination with a slightly modified compression ring assembly and workpiece becomes effective to maintain the latter in assembled relation even though improperly installed.

Further objects are to provide a pitot tube type flow measurement instrument mounting which is simple, inexpensive, versatile, easy to assemble, reliable, safe, compact and even somewhat decorative.

Other objects will be in part apparent and in part pointed out specifically hereinafter in connection with the description of the drawings that follows, and in which.

Figure 1:
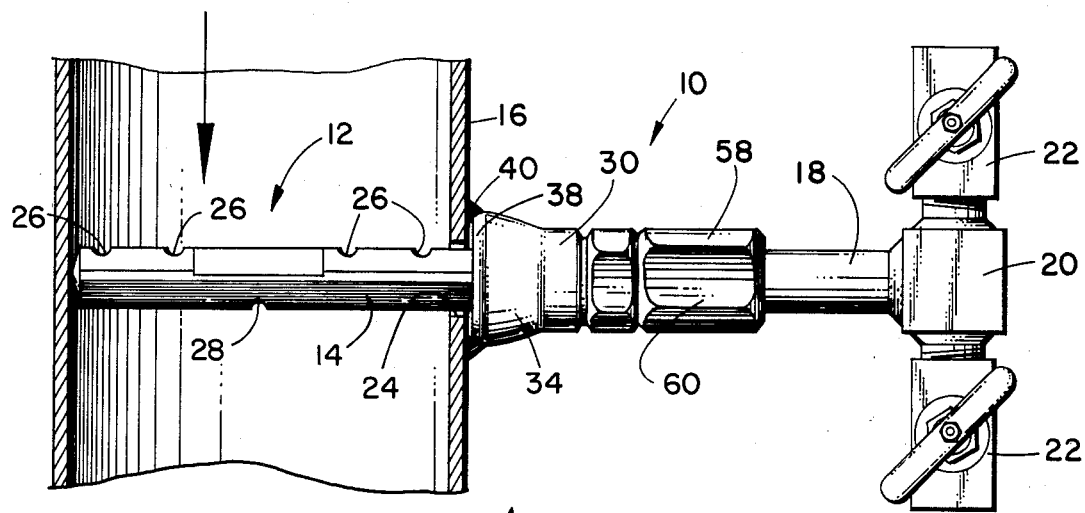
FIG. 1 is a view partly in half-section and partly in elevation showing the improved lockable mounting holding a pitot tube type flow measurement probe in operative position inside a pipe.

Referring next to the drawings for a detailed description of the present invention and, initially, to FIG. 1 for this purpose, reference numeral 10 has been chosen to broadly designate the improved lockable mounting while numeral 12 similarly connotes a representative flow measurement device of the type that in the particular form illustrated includes a first non-cylindrical body portion 14 containing one or more flat surfaces inserted as shown into a pipe or conduit 16 in position to be impacted by a fluid, either liquid or gaseous, flowing therein along with a second cylindrical body portion 18 located outside of the pipe and fitted with appropriate connections 20 and valving 22 which constitute external taps available to take off the upstream and downstream pressure readings. Pipe 16, of course, includes a probe-receiving opening 24 in its wall for the reception of the body portion 14 of the flow measurement device. The particular probe shown is of the pitot tube type having a plurality of upstream-facing ports 26 as well as a downstream-facing one 28. While not shown, the interior of the probe is subdivided into two separate pressure chambers, each being exposed to the conditions existing inside the pipe by means of one set or the other of the aforementioned ports.

The jist of the present invention, however, has nothing to do with the pressure measurement device, but rather, the mounting 10 therefor which seals it within probe-receiving opening 24 in the pipe wall while, at the same time, permitting it to be retracted out of the flow or removed altogether. Applicants' conventional mounting for such units consists of a bell-flanged collar 30 having a smooth cylindrical bore 32 extending axially thereof and sized to receive the external cylindrical body portion 18 of the probe with a sliding fit, all of which is most clearly revealed in FIGS. 2 and 3 to which reference will now be made. The bell-flange 34 is cupped as shown at 36 where it encircles the bore 32 while the peripheral edge 38 thereof is beveled to receive the weld 40. When thus welded to the pipe, a pressure and fluid-tight annular seal connects the two together. It remains necessary, however, to seal the probe body within the bore of the bell-flanged collar.

The remote end 42 of the collar opposite the bell 34 is externally threaded as seen at 44 to define a male coupling and, in addition, is undercut around the entrance to the bore (see reference numeral 46) to form a first cam-like seat adapted to cooperate with a similarly-shaped cam-forming seat 48 arranged in opposed relation to the latter and disposed on the inside of a compression nut 50 to squeeze and crimp a deformable ferrule 52 into fluid-tight annular contact with the cylindrical body portion 18 of the probe body lying outside the pipe. Compression nut 50 has a hexagonally-shaped exterior surface for the reception of a wrench along with the usual internally-threaded socket 51 that forms the female coupling adapted to screw onto male end 44 of the collar 30 and cooperate therewith to crimp the ferrule onto the probe body. Up to this point, the coupling 10 is conventional and has been used for years by applicants to fasten their probes into a pipe. On rare occasions, however, as previously noted, the person responsible for installing the probe fails to follow instructions and does not crimp the ferrule down tightly onto the probe body. Obviously, the resulting hazardous condition can result in the escape of fluid, a lowering of line pressure and damage to the probe to say nothing of the ever-present danger of someone being seriously injured.

Figure 2:
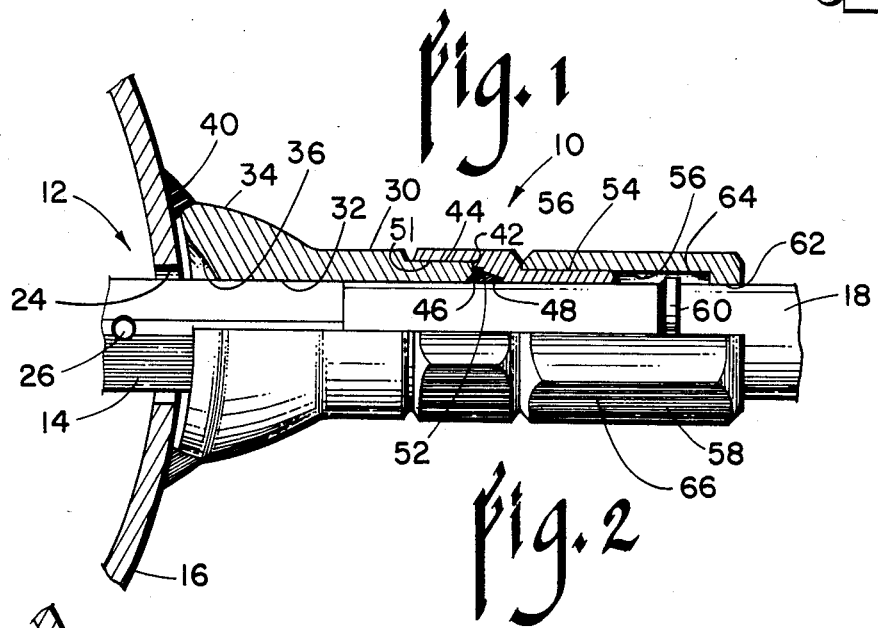
FIG. 2 is a fragmentary view to a greatly enlarged scale showing the mounting in properly assembled relation, one half having been shown in section and the other half in elevation; and, FIG. 3 is a fragmentary view like FIG. 2 and to the same scale but showing the mounting disassembled, portions of the probe having been broken away to conserve space.
Figure 3:
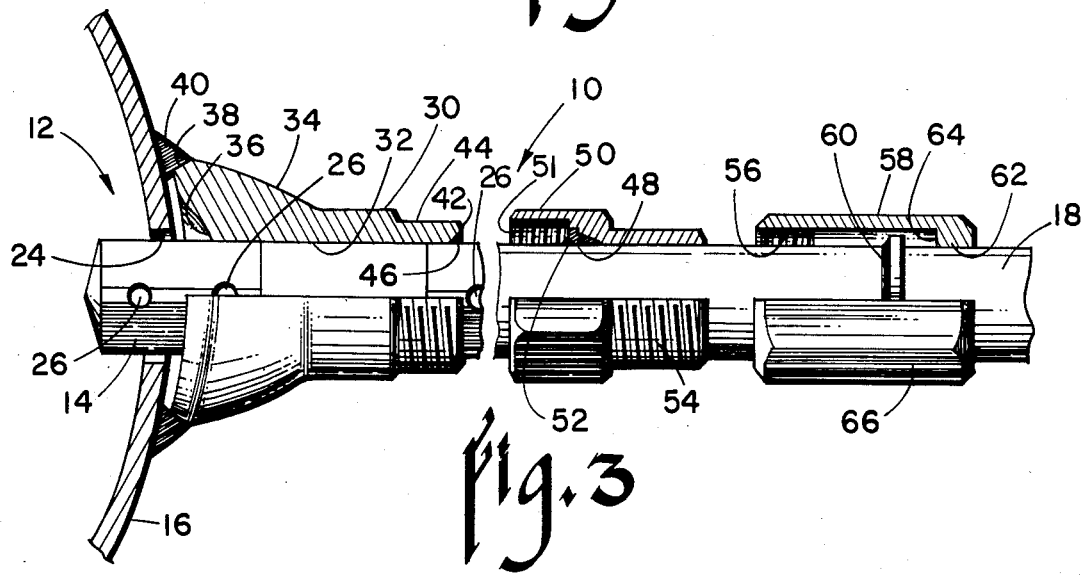

Applicants' improvement forming the subject matter hereof obviates the aforementioned danger by backing up the compression fitting subassembly just described with a positive lock. To begin with, the compression nut 50 is modified as shown in FIGS. 2 and 3 to include an externally-threaded male extension 54. Onto this extension screws the internally-threaded female section 56 of oversize open-ended locknut or cap 58. A fixed abutment-forming projection 60 is welded or otherwise permanently attached to the cylindrical body portion 18 of the pipe located beyond the threaded end of the compression nut when the probe is in its fully-inserted operative position shown in FIG. 1. The abutment-forming projection 60 is sized relative to the hollow interior of the cap 58 containing the threaded section 56 so as to pass easily into the latter as shown in both FIGS. 2 and 3 thereby permitting the cap to be screwed onto the male extension 54 of the compression nut therebehind. Projection 60, in the particular form shown, is a continuous annular rib, however, it need not be continuous or annular. The remote end of the cap 58 opposite from that portion (56) that screws onto the compression nut contains an inwardly-projecting annular rib 62 that defines a forwardly-facing shoulder 64 lying in opposed face-to-face relation to the abutment-forming projection 60. In the event that the projection 60 comprises a continuous annular abutment as shown then, obviously, rib 62 and the shoulder 64 contained thereon need not be uninterrupted. Thus, when the cap 60 is screwed onto the compression nut as shown in FIG. 2, a positive lock is formed since if the probe were to blow out of its opening 24 in the pipe, abutment 60 would immediately engage shoulder 64 and remain essentially in place.

The exterior surface of 66 of cap 60 is hexagonally-shaped as was the case with the compression nut to receive a wrench. With cap 58 screwed onto the compression nut and the latter screwed onto the bell-flanged collar, even a cursory external examination insures that the probe cannot escape the mounting 10 even in the event that the ferrule 52 is not crimped onto the cylindrical body portion 18 of the probe. On the other hand, by unscrewing the compression nut from the collar extension, the entire probe can be removed from the mounting 10 as shown in FIG. 3. This can take place even though the cap remains screwed onto the compression nut in the manner shown in FIG. 2. Any time the assembly is screwed together as shown in FIGS. 1 and 2, it is locked securely to the pipe and cannot blow out even though it could, perhaps, leak if the ferrule happens to have been left uncrimped altogether.

What is claimed is:

1. For use with a first high pressure mounting for removably positioning cylindrically-bodied flow measurement probes in a pipeline where such mounting includes a hollow tubular collar welded to the pipe in alignment with a probe-receiving opening therein and which collar is sized to slidably receive the body of the probe for movement into and out of the pipe, a relatively deformable and compressible ferrule movable into abutting relation to an annular seat provided on the end of the collar remote from the welded end thereof, and a compression nut adapted to be screwed onto a threaded end of the collar adjacent the seat and cooperate therewith and with the ferrule therebetween to crimp the latter tightly around the pipe thus sealing the probe in a fixed operative position, a second mounting system coaxial with the first, yet spaced therefrom for preventing pullout which comprises: first connecting means providing an extension of the compression nut on the end thereof remote from the end thereof attachable to the collar, first abutment-forming means exposed in fixed position on the outside of the probe body beyond the compression nut extension, and an open-ended generally cup-shaped cap mounted on the probe body for movement therealong on the opposite side of the first abutment-forming means from the compression nut extension, said cap including a second connecting means sized to pass over the first abutment-forming means and connect onto the first connecting means cooperating therewith when so connected to prevent relative axial movement therebetween, and said cap having a second abutment-forming means positioned and adapted to engage the first abutment-forming means and prevent removal of the probe body from its probe-receiving opening in the pipe when said first and second connecting means are interconnected.

2. The improved positive lock as set forth in claim 1 in which: the first and second connecting means comprise mutually-engageable threaded sections.

3. The improved positive lock as set forth in claim 1 in which: at least one of said first and second abutment-forming means comprises a continuous annular rib.

4. The improved positive lock as set forth in claim 1 in which: the first connecting means comprises an externally-threaded male extension and the second connecting means comprises an internally-threaded female section extending inwardly toward the compression nut from the second abutment-forming means.

5. The improved positive lock as set forth in claim 3 in which: both of the first and second abutment-forming means comprise continuous annular ribs.

* * * * *